US009525795B2

(12) United States Patent
Sato et al.

(10) Patent No.: US 9,525,795 B2
(45) Date of Patent: Dec. 20, 2016

(54) IMAGE FORMING APPARATUS WITH ROTARY POLYGON MIRROR SPEED CONTROL

(71) Applicant: CANON KABUSHIKI KAISHA, Tokyo (JP)

(72) Inventors: Kazumi Sato, Kashiwa (JP); Toshifumi Kakutani, Abiko (JP); Yousuke Hata, Ichikawa (JP); Shinya Suzuki, Toride (JP); Takayuki Iikura, Kashiwa (JP); Kazunori Miyake, Abiko (JP); Shuji Obata, Noda (JP); Manabu Koseki, Sakuragawa (JP); Takeyuki Suda, Nagareyama (JP); Hirohisa Nakajima, Tsukubamirai (JP); Mitsuhiro Sugeta, Abiko (JP); Toshiyuki Abe, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/952,277

(22) Filed: Nov. 25, 2015

(65) Prior Publication Data

US 2016/0150113 A1 May 26, 2016

(30) Foreign Application Priority Data

Nov. 26, 2014 (JP) ................................ 2014-238794

(51) Int. Cl.

*H04N 1/00* (2006.01)
*H04N 1/113* (2006.01)

(Continued)

(52) U.S. Cl.

CPC ........ *H04N 1/00891* (2013.01); *G03G 15/043* (2013.01); *G06K 15/12* (2013.01);

(Continued)

(58) Field of Classification Search

None

See application file for complete search history.

(56) References Cited

U.S. PATENT DOCUMENTS

| | | | | |
|---|---|---|---|---|
| 5,519,431 A | 5/1996 | Kusano | ......................... | 347/247 |
| 5,633,673 A | 5/1997 | Sato | .............................. | 347/240 |

(Continued)

FOREIGN PATENT DOCUMENTS

| | | |
|---|---|---|
| JP | H07-36600 | 4/1995 |

*Primary Examiner* — Benny Q Tieu

*Assistant Examiner* — Sunil Chacko

(74) *Attorney, Agent, or Firm* — Fitzpatrick, Cella, Harper & Scinto

(57) ABSTRACT

An image forming apparatus including: a reading device; an operating portion; a light source; a rotary polygon mirror; a motor configured to rotate the rotary polygon mirror; and a motor control portion configured to start the motor to control the motor at a first rotation speed in response to a fact that a predetermined action is performed on one of the operating portion and the reading device in a stopped state of the rotary polygon mirror, and then to control the motor at a second rotation speed higher than the first rotation speed in response to an instruction to start image formation from the operating portion, the motor control portion being configured to control the motor at the second rotation speed, without controlling the motor at the first rotation speed, in response to a fact that the receiving portion receives image data before the motor reaches the first rotation speed.

18 Claims, 9 Drawing Sheets

(51) Int. Cl.
*G06K 15/12* (2006.01)
*G06K 15/00* (2006.01)
*G03G 15/043* (2006.01)

(52) U.S. Cl.
CPC ......... *G06K 15/406* (2013.01); *H04N 1/0032* (2013.01); *H04N 1/00795* (2013.01); *H04N 1/113* (2013.01)

(56) References Cited

U.S. PATENT DOCUMENTS

| | | | | |
|---|---|---|---|---|
| 5,754,576 | A | 5/1998 | Kusano | 372/38 |
| 5,818,503 | A | 10/1998 | Kusano | 347/247 |
| 7,277,113 | B2 | 10/2007 | Sobue | 347/250 |
| 2005/0179762 | A1* | 8/2005 | Watanabe | G02B 26/122 347/115 |
| 2007/0216758 | A1* | 9/2007 | Matsuura | H04N 1/00885 347/261 |
| 2015/0293350 | A1 | 10/2015 | Sato | G02B 26/129 |

* cited by examiner

IMAGE FORMING APPARATUS WITH ROTARY POLYGON MIRROR SPEED CONTROL

BACKGROUND OF THE INVENTION

Field of the Invention

The present invention relates to an image forming apparatus including a motor configured to rotate a rotary polygon mirror.

Description of the Related Art

Hitherto, in an image forming apparatus such as a copying machine and a printer, a laser optical system configured to emit a light beam from a semiconductor laser a rotary polygon mirror is widely used to form a latent image on a photosensitive member. It is known that a motor which rotates the rotary polygon mirror has a large inertia and therefore needs a long time to stabilize its rotation. Further, along with increase in speed of the image forming apparatus in recent years, the rotary polygon mirror is required to be rotated at an extremely high speed. Therefore, a long time is required for the motor to rise from a stopped state. Further, the high-speed rotation of the rotary polygon mirror has a problem of a noise caused by wind whistle and a problem in a reduced lifetime of the motor.

The image forming apparatus cannot start image formation unless the motor is in a stably rotating state. Therefore, first copy output time (or first print output time) is affected by the time required for the motor to rise.

In order to solve problems similar to those described above, in Japanese Patent No. H07-36600, there is disclosed a technology of adjusting a speed of the motor. Specifically, in Japanese Patent No. H07-36600, there is disclosed a technology of controlling, when transfer of recording data is started, the motor to rotate at a speed lower than a target rotation speed set for the image formation after turning ON a main power source, and then controlling the motor to rotate at a higher speed (the target rotation speed set for the image formation) in accordance with an instruction to start recording.

In a case where a user transmits image data (recording data) from an external information device such as a PC so that the image forming apparatus forms an image, the user inputs the instruction to start the image formation to the external information device. The image forming apparatus is desired to be able to form an image at the time of reception of the image data from the external information device or to transition to a state in which the image can be formed as soon as possible after the reception of the image data. After a step of rotating the motor at the rotation speed smaller than the target rotation speed set for the image formation in response to the reception of the image data from the external information device, the motor is controlled through a step of accelerating the motor so that the rotation speed of the motor becomes equal to the target rotation speed set for the image formation in response to the instruction to start recording. If the motor is controlled in the above-mentioned manner, there is a fear in that increase in start time of the motor may lead to increase in the first print output time.

SUMMARY OF THE INVENTION

Therefore, the present invention provides an image forming apparatus configured to prevent occurrence of a delay in first print output time due to increase in start time of a motor configured to rotate a rotary polygon mirror when image formation is to be performed based on image data transmitted from an external information device.

In order to solve the above-mentioned problems, according to one embodiment of the present invention, there is provided an image forming apparatus including:

a receiving portion configured to receive image data from an external information device;

a reading device configured to read an original to generate image data;

an operating portion through which an image forming condition and an instruction to start image formation are input;

a light source configured to emit a light beam for forming an electrostatic latent image on a photosensitive member;

a rotary polygon mirror configured to deflect the light beam so that the light beam scans the photosensitive member;

a motor configured to rotate the rotary polygon mirror;

a motor control portion configured to start the motor and control the motor at a first rotation speed in response to a fact that a predetermined action is performed on one of the operating portion and the reading device in a stopped state of the rotary polygon mirror, and then to control the motor at a second rotation speed higher than the first rotation speed in response to the instruction from the operating portion, the motor control portion being configured to control the motor at the second rotation speed, without controlling the motor at the first rotation speed, in response to a fact that the receiving portion receives the image data before a rotation speed of the motor reaches the first rotation speed; and a light source control portion configured to control the light source to emit the light beam based on the image data in a state in which the rotary polygon mirror is rotated by the motor at the second rotation speed.

Further features of the present invention will become apparent from the following description of exemplary embodiments with reference to the attached drawings.

DESCRIPTION OF THE EMBODIMENTS

Now, the embodiments will be described with reference to the accompanying drawings.

(First Embodiment)

Figure 1:
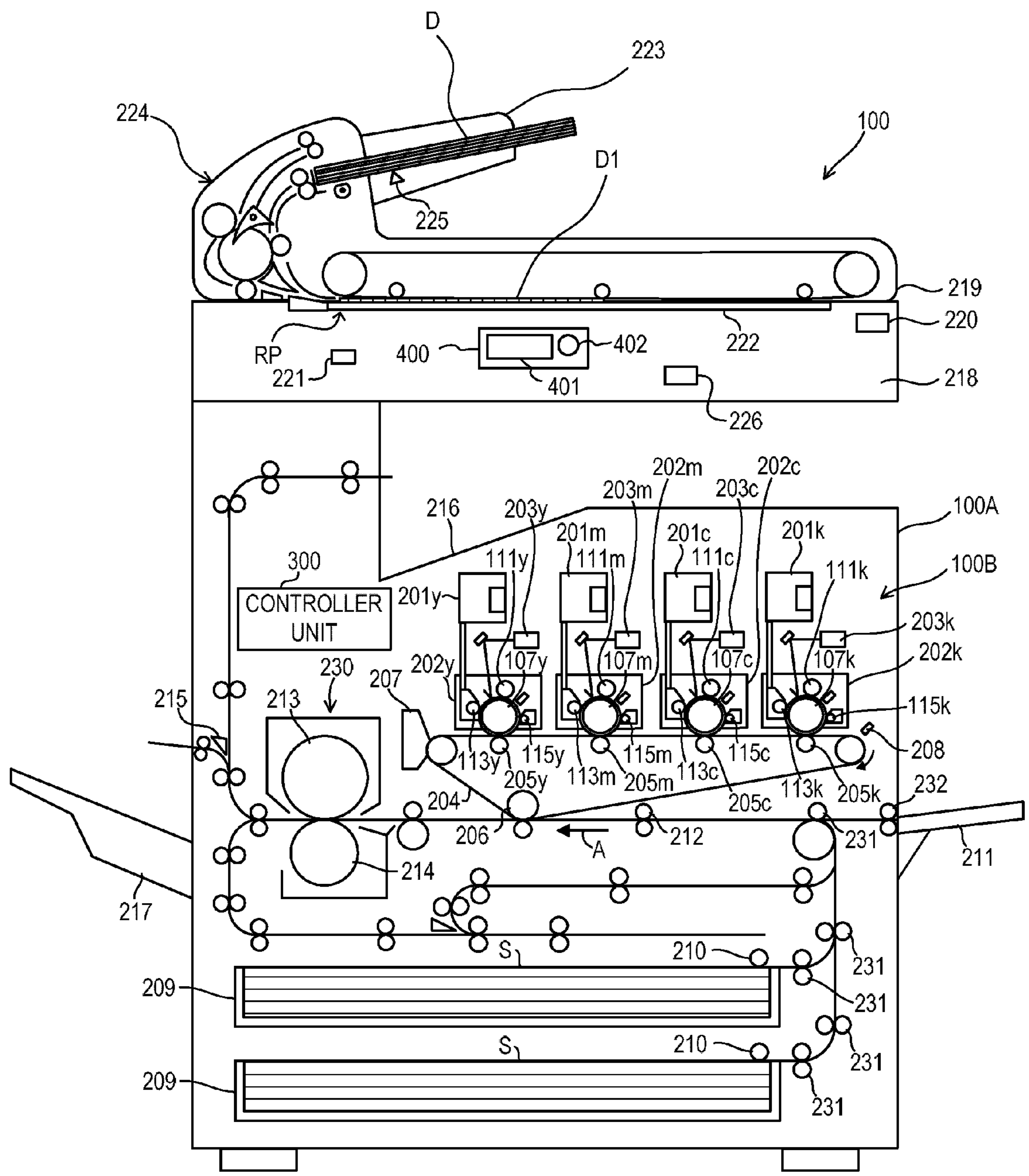
FIG. 1 is a diagram illustrating a configuration example of an image forming apparatus.
Figure 2:
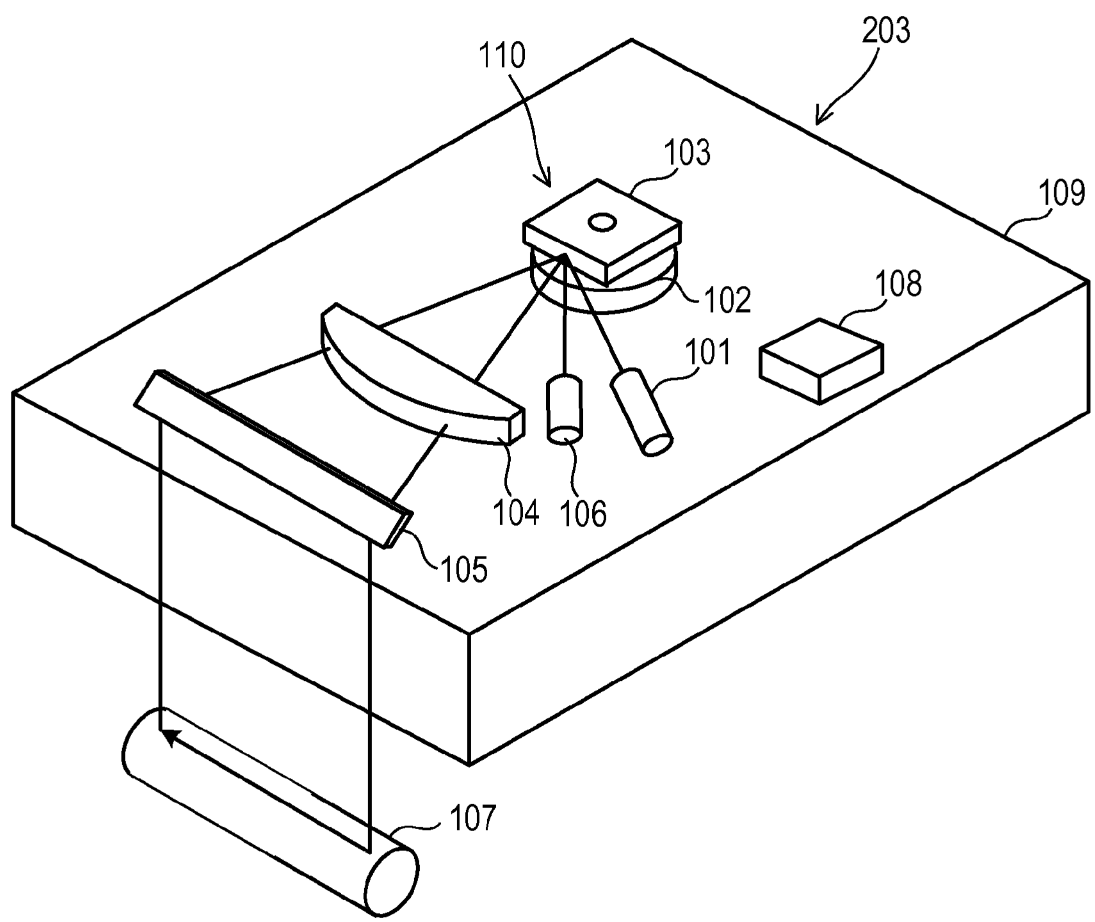
FIG. 2 is a diagram illustrating a configuration of a light scanning apparatus.

FIG. 1 is a diagram schematically illustrating a configuration of an image forming apparatus 100. FIG. 2 is a diagram schematically illustrating a configuration of a yellow light scanning apparatus (laser scanner unit) 203*y* (each of configurations of a magenta light scanning apparatus 203*m*, a cyan light scanning apparatus 203*c*, and a black light scanning apparatus 203*k* is the same as that of the yellow light scanning apparatus) included in the image forming apparatus 100.

A feed cassette 209 is placed on a bottom portion of an apparatus main body. Above the feed cassette 209, an intermediate transfer member 204 is provided. On an upper surface of the intermediate transfer member 204, four process units in total, namely, a process unit 202*y* for yellow, a process unit 202*m* for magenta, a process unit 202*c* for cyan, and a process unit 202*k* for black, are provided. On a downstream side in a sheet conveying direction, a fixing device 230 including a fixing roller 213 and a pressure roller 214 is provided. Further, in an upper part of the apparatus main body, an original reading device (hereinafter referred to simply as "reading device") 218 is provided.

Now, a specific configuration will be described together with actions. Toner bottles (toner containers) 201*y*, 201*m*, 201*c*, and 201*k* are respectively filled with yellow, magenta, cyan, and black toners (developers). The process units 202*y* to 202*k* respectively include photosensitive drums (photosensitive members) 107 (107*y*, 107*m*, 107*c*, and 107*k*), developing devices 113 (113*y*, 113*m*, 113*c*, and 113*k*), charging rollers 111 (111*y*, 111*m*, 111*c*, and 111*k*), and photosensitive-drum cleaners 115 (115*y*, 115*m*, 115*c*, and 115*k*). The charging rollers 111 are provided to uniformly charge surfaces of the photosensitive drums 107, respectively.

The light scanning apparatus 203*y*, 203*m*, 203*c*, and 203*k* emit laser light (hereinafter referred to as "light beams") onto the uniformly charged photosensitive drums 107 in accordance with image information to form electrostatic latent images respectively on the photosensitive drums (photosensitive members) 107. The formed electrostatic latent images are developed as toner images by the developing devices 113 of the process units 202*y* to 202*k*.

The toner images formed on the photosensitive drums 107 serving as image bearing members are primarily transferred onto the intermediate transfer member 204 in a sequentially superimposed manner. The superimposed toner images on the intermediate transfer member 204 are secondarily transferred onto a sheet (recording medium). Primary transfer rollers 205*y*, 205*m*, 205*c*, and 205*k* are for realizing stable transfer while applying a bias voltage at the time of the primary transfer of the toner images from the photosensitive drums 107 to the intermediate transfer member 204.

The toner images primarily transferred onto the intermediate transfer member 204 are secondarily transferred onto the sheet by a secondary transfer roller 206. Residual toners which remain after the transfer with the secondary transfer roller 206 are collected by an intermediate transfer member cleaner 207. A reflected-light intensity sensor 208 detects a toner density on the intermediate transfer member 204 based on a reflected-light intensity.

The sheet is fed from the feed cassette 209 by a feeding roller 210. After skew feed is corrected by registration rollers 212, the sheet is conveyed to the secondary transfer roller 206. After the toner images are transferred onto the sheet by the secondary transfer roller 206, the toner images are thermally fixed by the fixing roller 213 and the pressure roller 214. Then, the sheet is conveyed by a delivery flapper 215 to an inner delivery tray 216 or a delivery tray 217.

The reading device 218 scans an original D1 placed on an original platen 222 by using a CCD 221. The thus obtained image data is transmitted to a RAM (storage portion) 303 through a CPU 301 illustrated in FIG. 3 referred to later. An original pressure plate 219 is openable and closable with respect to the original platen 222. The original pressure plate 219 serves as a cover to be placed on the original D1 placed on the reading device 218. An open and closed condition (opening and closing action) of the original pressure plate 219 can be detected by the CPU 301 through a pressure plate opening and closing sensor 220. Further, the reading device 218 may include an original stacking portion 223, a conveyance device (conveyance portion) 224, and a sensor (detection portion) 225. Onto the original stacking portion 223, the originals D are placed. The conveyance device 224 conveys the originals D stacked on the original stacking portion 223 to a reading position RP where the originals D are read one by one. The sensor 225 detects that originals are stacked on the original stacking portion 223. As illustrated in FIG. 1, an operating portion 400 includes a touch panel (display portion) 401 and a start button 402. The user inputs an image forming condition of an image to be formed based on the image data read by the reading device 218 and an instruction to start image formation through the operating portion 400.

As illustrated in FIG. 2, each of the light scanning apparatus 203 includes a light source (laser diode) 101, a deflection unit 110, an imaging lens 104, a reflection mirror 105, a beam detector (hereinafter referred to as "BD") 106, a thermistor (temperature detecting portion) 108, and an optical box 109. The light source 101 emits a light beam modulated based on the image data transmitted from a controller unit 300 so as to form an electrostatic latent image on the corresponding photosensitive drum 107. The deflection unit 110 includes a rotary polygon mirror (polygon mirror) 103 and a motor (rotary polygon mirror driving motor) 102 configured to rotate the rotary polygon mirror 103. The deflection unit 110 deflects the light beam so that the light beam scans a surface of the corresponding photosensitive drum 107.

The light source 101 generates the light beam modulated based on an image signal transmitted from an ASIC (light source control portion) 601. The light beam is reflected by the rotary polygon mirror 103 rotated by the motor 102 to pass through the imaging lens 104. Then, the light beam is reflected by the reflection mirror 105 to reach the corresponding photosensitive drum 107 to form the latent image on the photosensitive drum 107.

The BD 106 detects the reflected light from the rotary polygon mirror 103. The result of detection is used to determine an image writing timing to the corresponding photosensitive drum 107. The thermistor 108 detects a temperature in the light scanning apparatus 203. The detected value is output to the CPU 301. The motor 102 rotates in response to an acceleration signal (ACC) and a deceleration signal (DCC) input thereto, and outputs a pulse signal (FG) in proportion to a rotation speed through an internal circuit.

Figure 3:
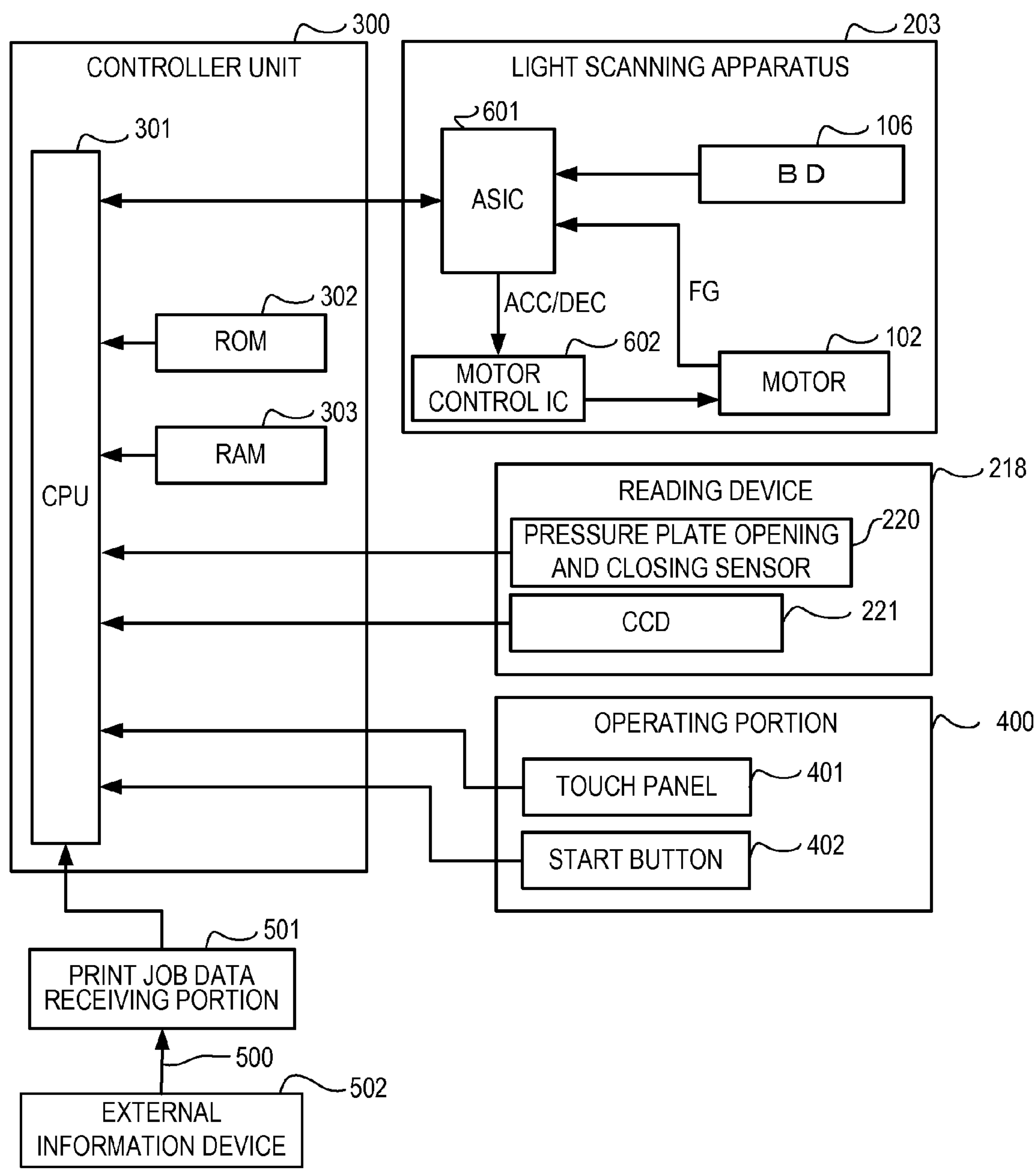
FIG. 3 is a block diagram of a main part of the image forming apparatus of FIG. 1.

FIG. 3 is a block diagram illustrating internal configurations and interrelationships of the controller unit 300, the light scanning apparatus 203, the reading device 218, the operating portion 400, and a print job data receiving portion 501, which are mounted in the image forming apparatus 100 illustrated in FIG. 1.

In FIG. 3, the controller unit 300 includes the CPU 301, a ROM 302, and the RAM 303. The ROM 302 and the RAM 303 are connected to the CPU 301. A motor control IC 602 is also connected to the controller unit 300 through the ASIC 601 of the light scanning apparatus 203. The CPU 301 controls the entire controller unit 300 and executes processing illustrated in FIG. 4 to FIG. 9 referred to later. The ROM 302 stores a program for an operation of the CPU 301, and stores target rotation speeds A and B of the motor 102 described later. The RAM 303 is used so that the CPU 301 can temporarily store data therein. The motor control IC 602 performs rotation control for the motor 102 included in the light scanning apparatus 203 based on a target rotation speed set in the ASIC (setting portion) 601 in response to an instruction from the CPU 301. The motor control IC 602 rotates the motor 102 in response to the acceleration signal (ACC) and the deceleration signal (DCC) input thereto. The motor 102 outputs the pulse signal (FG) in proportion to the rotation speed through the internal circuit. Further, the BD 106 included in the light scanning apparatus 203 detects whether or not light is emitted from the light source 101. A value indicating the presence/absence of light emission is output to the ASIC 601. A combination of the ASIC 601 and the motor control IC 602 is referred to as a motor control portion.

Various sensors (not shown) required for the image formation and an ASIC (not shown) configured to drive a motor used to convey the sheet are also connected to the CPU 301. In response to an instruction from the CPU 301, the image forming apparatus 100 performs an image forming operation.

Next, rotation control for the motor 102 will be described referring to FIG. 3. The CPU 301 sets the target rotation speed of the motor 102 in the ASIC 601. The ASIC 601 outputs the acceleration signal (hereinafter referred to as "ACC signal") for accelerating the motor 102 or the deceleration signal (hereinafter referred to as "DEC signal") for decelerating the motor 102 to the motor control IC 602. When receiving the ACC signal, the motor control IC 602 charges a capacitor (charge pump capacitor) to accelerate the motor 102. On the other hand, when receiving the DEC signal, the motor control IC 602 discharges the capacitor to decelerate the motor 102. Thereafter, when the FG signal falls within a predetermined range, the ASIC 601 changes a command value (the ACC signal or the DEC signal) to the motor control IC 602 so that an interval between the BD signals output from the BD 106 falls within a predetermined range, thereby controlling the rotation speed.

Further, when the print job data receiving portion 501 receives print data (image data) 500 from an external information device 502, the CPU 301 generates a print data input trigger and starts the motor 102 in accordance with the print data input trigger (See Example 2 described later). Alternatively, the target rotation speed (target value of the rotation speed) of the motor 102 is changed (See a second embodiment described later).

Further, the CPU 301 detects an open and closed state (opening and closing action) of the original pressure plate 219 by the pressure plate opening and closing sensor 220 included in the reading device 218. Further, the CPU 301 detects states of the touch panel 401 and the start button 402 which are included in the operating portion 400. Further, the sensor 225 provided to the original stacking portion 223 detects that the originals D are stacked on the original stacking portion 223. Specifically, through the detection of the above-mentioned states, the CPU 301 detects a preaction which is performed by the user who is to perform the image formation for the copy. The image forming apparatus of the embodiment may include a motion sensor 226 configured to detect that a person approaches an image forming apparatus main body within a predetermined distance from the image forming apparatus main body.

As described above, the CPU 301 executes the image formation for two kinds of jobs, namely, a copy job based on a copy action performed by the user and a print job based on the reception of the print data 500.

Example 1

Figure 4:
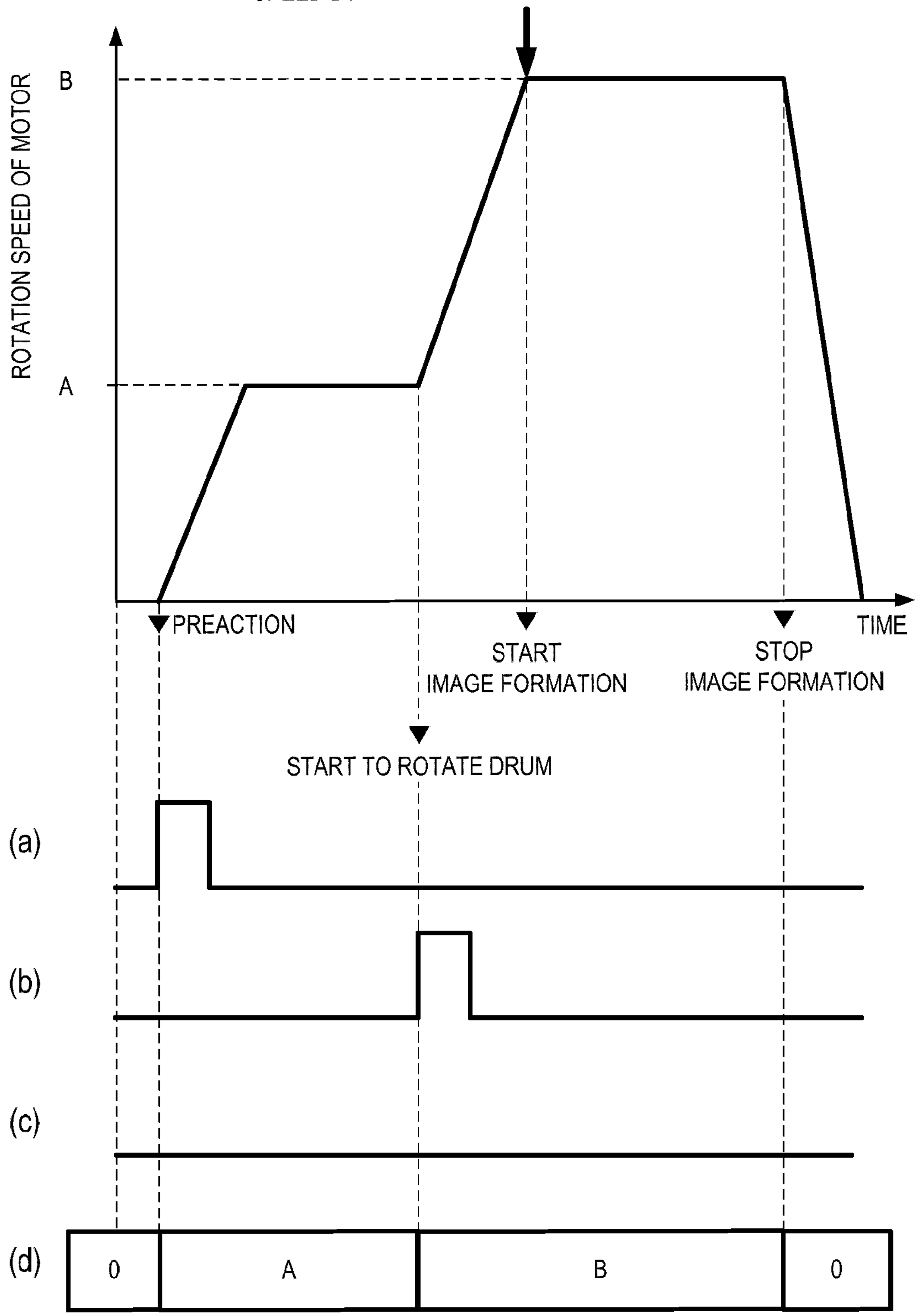
FIG. 4 is a diagram showing a relationship among timing charts and a rotation speed of a motor according to Example 1.

FIG. 4 is a diagram showing a relationship among timing charts and the rotation speed of the motor 102 in a case where the image formation is executed for the copy job in the image forming apparatus 100 according to the embodiment. Part (a) of FIG. 4 is a timing chart of an output pulse of the sensor (for example, the pressure plate opening and closing sensor 220) configured to detect a predetermined action performed on the reading device 218 or the operating portion 400. Part (b) of FIG. 4 is a timing chart of an output pulse of a sensor configured to detect that the start button 402 of the operating portion 400 is pressed. Part (c) of FIG. 4 is a timing chart of a trigger pulse generated when the print data is input to the print job data receiving portion 501. Part (d) of FIG. 4 is a graph showing a target rotation speed setting value of the motor 102 on a time axis.

In the case where the image formation of the copy job is executed, it is apparent that no print data is received by the print job data receiving portion 501. Therefore, as shown in part (c) of FIG. 4, no trigger in response to the input of the print data is generated. While the rotary polygon mirror 103 is in a stopped state, a predetermined action for the image formation (a preaction for the image forming operation or an input action of an image forming condition to the operating portion 400) is performed on the recording device 218 or the operating portion 400 (See part (a) of FIG. 4.). Then, the CPU 301 sets a first rotation speed (a setting value A) (for example, 30,000 rpm) in the ASIC 601 to start driving the motor 102 (See part (d) of FIG. 4.). In this case, the FG signal is detected to control the rotation speed of the motor 102 without lighting the light source 101 so as not to shorten a lifetime of the light source 101.

Next, the start button 402 of the operating portion 400 is pressed (See part (b) of FIG. 4.). Then, the CPU 301 sets a second rotation speed (a target rotation speed at the time of the image formation: a setting value B) (for example, 45,000 rpm) higher than the first rotation speed in the ASIC 601 so as to execute the image formation (See part (d) of FIG. 4.). Next, when the rotation speed of the motor 102 is stabilized with a predetermined accuracy (within a range of 45,000±0.5%) by the acceleration or deceleration of the motor 102, the image formation is started. When the image formation is completed, the setting value of the rotation speed of the motor 102 is set to zero to stop the rotation of the motor 102.

As described above, a rise time from 30,000 rpm as the setting value A to 45,000 rpm as the setting value B is shorter than a rise time from 0 rpm to 45,000 rpm. Therefore, the first copy output time can be reduced. In addition, during the rotation at the first rotation speed A of 30,000 rpm, noise generated by the motor 102 can be reduced.

Figure 5:
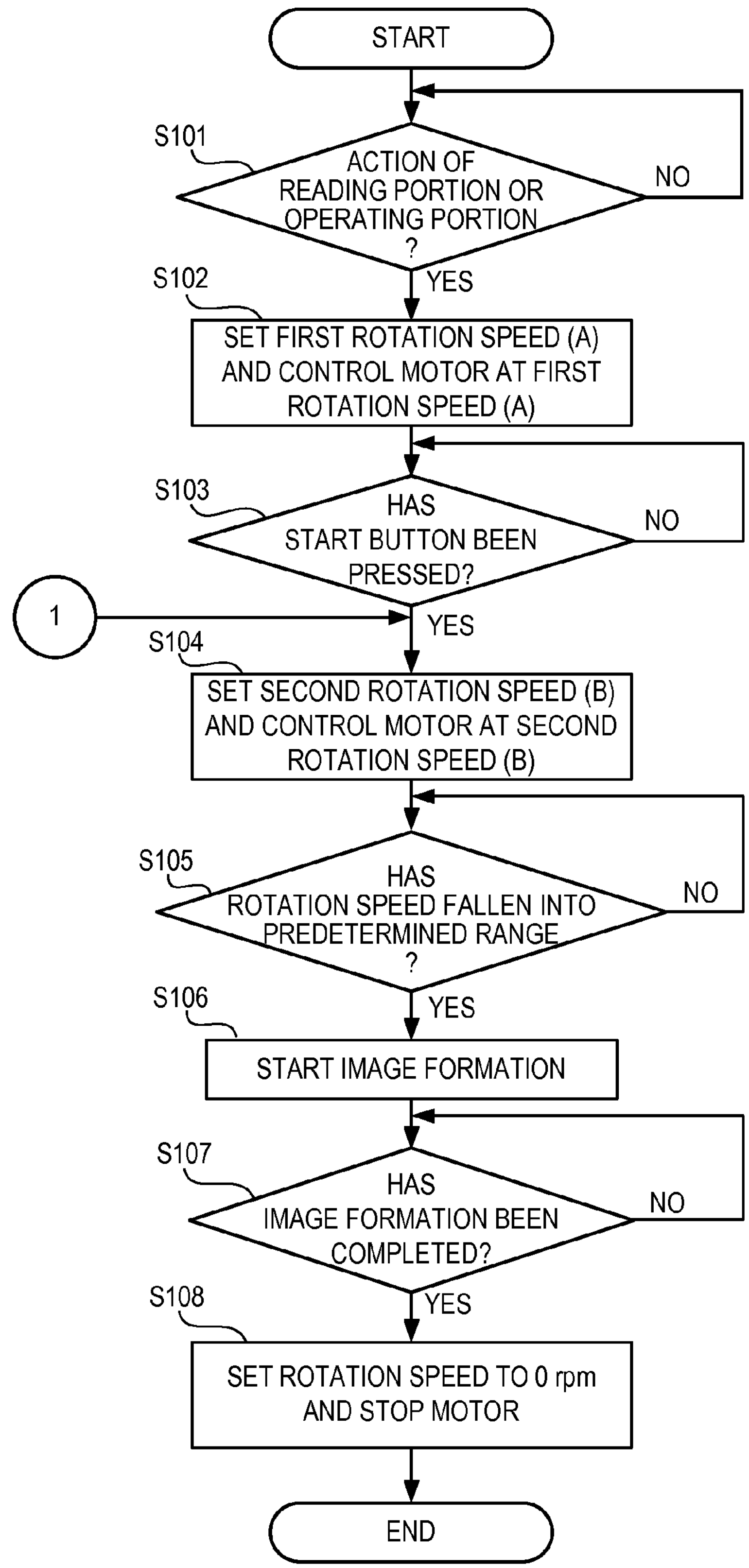
FIG. 5 is a flowchart illustrating a control procedure of the image forming apparatus according to Example 1.

FIG. 5 is a flowchart illustrating a control procedure performed by the CPU 301 when the control of the motor 102, which has been described referring to FIG. 4, is executed. When the CPU 301 detects the opening of the original pressure plate 219 by the pressure plate opening and closing sensor 220 of the reading device 218 or an action performed on the operating portion 400 (YES in Step S101), the CPU 301 sets the first rotation speed (the setting value A: 30,000 rpm) in the ASIC 601 (Step S102). Here, the ASIC 601 instructs the motor control IC 602 to control the motor 102 at a predetermined rotation speed. Specifically, the motor 102 is started to output the FG signal to the ASIC 601. The ASIC 601 outputs the ACC signal or the DEC signal to the motor control IC 602 while detecting the FG signals, thereby controlling the rotation speed of the motor 102. When the motion sensor 226 detects a person present at the predetermined distance or closer to the image forming apparatus in Step S101, the processing performed by the CPU 301 may proceed to Step S102. When the motion sensor 226 does not detect a person present at the predetermined distance or closer to the image forming apparatus, the processing may return to Step S101.

Thereafter, when the user presses the start button 402 to start copying (YES in Step S103), the CPU 301 sets the second rotation speed (the setting value B: 45,000 rpm) in the ASIC 601 (Step S104) simultaneously with the start of rotation of the photosensitive drums 107. The ASIC 601 controls the motor 102 so as to accelerate the motor 102 while detecting the FG signals output from the motor 102. Then, the ASIC 601 controls the motor 102 so that the motor 102 stably rotates at the target rotation speed (the second rotation speed: the setting value B). Specifically, the motor 102 is accelerated or decelerated until an FG target value obtained by conversion from the target rotation speed falls within the predetermined accuracy range (for example, 45,000 rpm±0.5% in the rotation speed) (YES in Step S105). Thereafter, the light source 101 is controlled to emit light. The rotation speed control is switched to the rotation speed control based on the intervals between the BD signals output from the BD 106 so as to execute the image formation (Step S106). After the image formation is completed (YES in Step S107), the light emission of the light source 101 is stopped, and the rotation of the motor 102 is stopped (Step S108).

Example 2

Next, the other image forming operation (the image formation of the print job) according to the first embodiment will be described. In Example 1, the driving rotation speed of the motor 102 is set to the first rotation speed which is different from the rotation speed (the second rotation speed) for the image formation based on the operation of the reading device 218 or the operating portion 400, to thereby drive the motor 102. On the other hand, in Example 2, the image formation is performed in response to the reception of the print data 500 by the print job data receiving portion 501 illustrated in FIG. 3 from the external information device 502.

Figure 6:
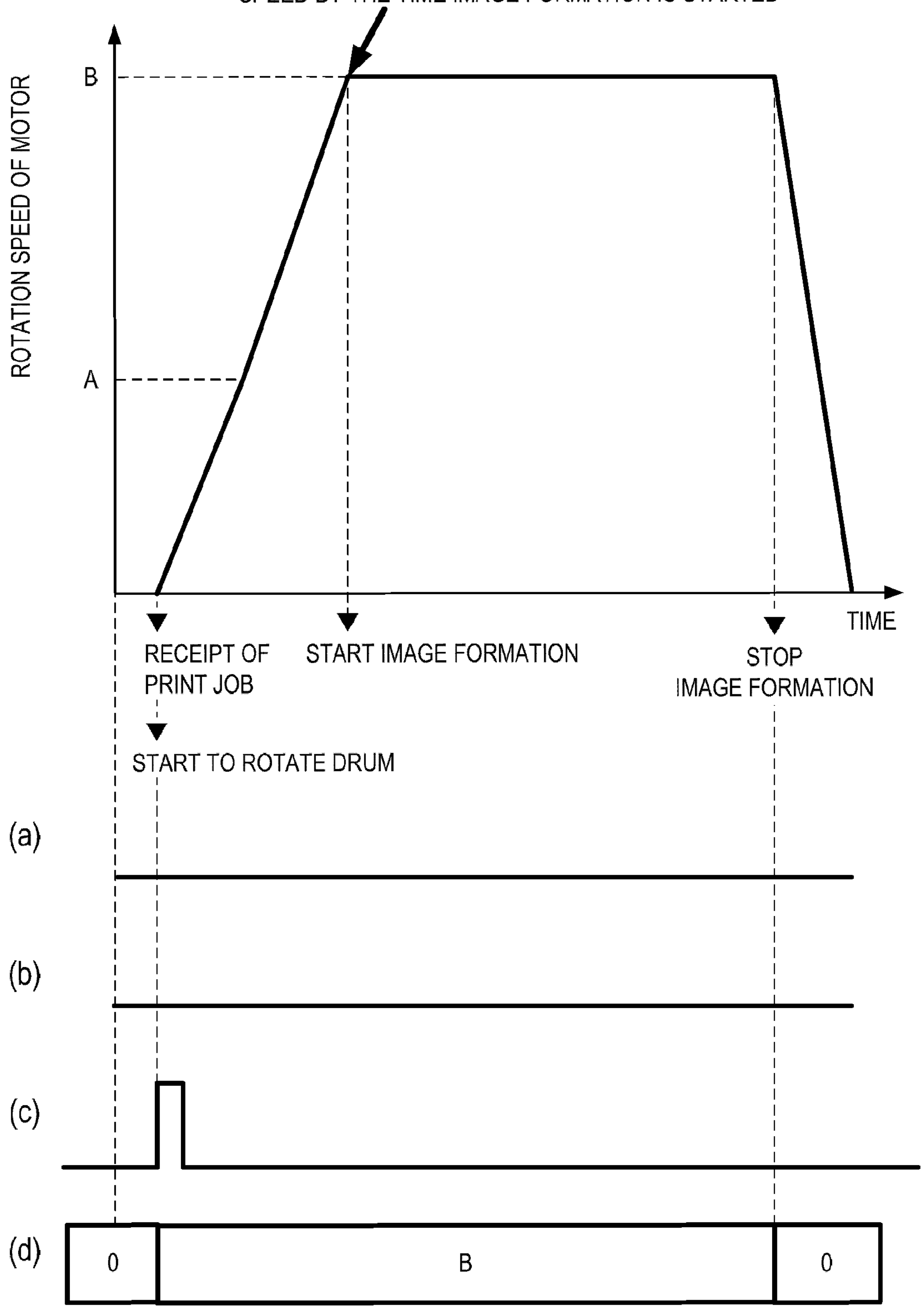
FIG. 6 is a diagram showing a relationship among timing charts and a rotation speed of a motor according to Example 2.

FIG. 6 is a diagram showing a relationship among timing charts and the rotation speed of the motor 102 according to Example 2. Part (a) of FIG. 6 is a timing chart of the output pulse of the sensor configured to detect the predetermined action (the input action of the image forming condition to the operating portion 400) performed on the reading device 218 or the operating portion 400. Part (b) of FIG. 6 is a timing chart of the output pulse of the sensor configured to detect the press of the start button 402 of the operating portion 400. Part (c) of FIG. 6 is a timing chart of the trigger pulse generated when the print data is input to the print job data receiving portion 501. Part (d) of FIG. 6 is a graph showing the target rotation speed setting value of the motor 102 on a time axis. When the image formation of the print job is executed, the reading device 218 and the operating portion 400 are not operated. Therefore, the output pulse is not generated from the sensors as shown in parts (a) and (b) of FIG. 6.

When the print data 500 output from the external information device 502 is received by the print job data receiving portion 501, the CPU 301 internally generates a print data input trigger (See part (c) of FIG. 6.). Then, the CPU 301 sets the rotation speed (the setting value B) for executing the image formation without setting the first rotation speed (the setting value A) in the ASIC 601, and then starts driving the motor 102 (See part (d) of FIG. 6.). In this case, the setting value A is, for example, 30,000 rpm, and the setting value B is, for example, 45,000 rpm.

Next, when the rotation speed of the motor 102 is stabilized at the predetermined accuracy (within the range of 45,000±0.5%), the image formation is started. When the image formation is completed, the setting value of the rotation speed of the motor 102 is set to zero to stop the rotation (See part (d) of FIG. 6.).

As described above, the motor 102 is driven so that the rotation speed of the motor 102 is increased from zero to the setting value B (45,000 rpm) without waiting at the rotation speed of the setting value A (30,000 rpm). Therefore, the first print output time is not delayed.

Figure 7:
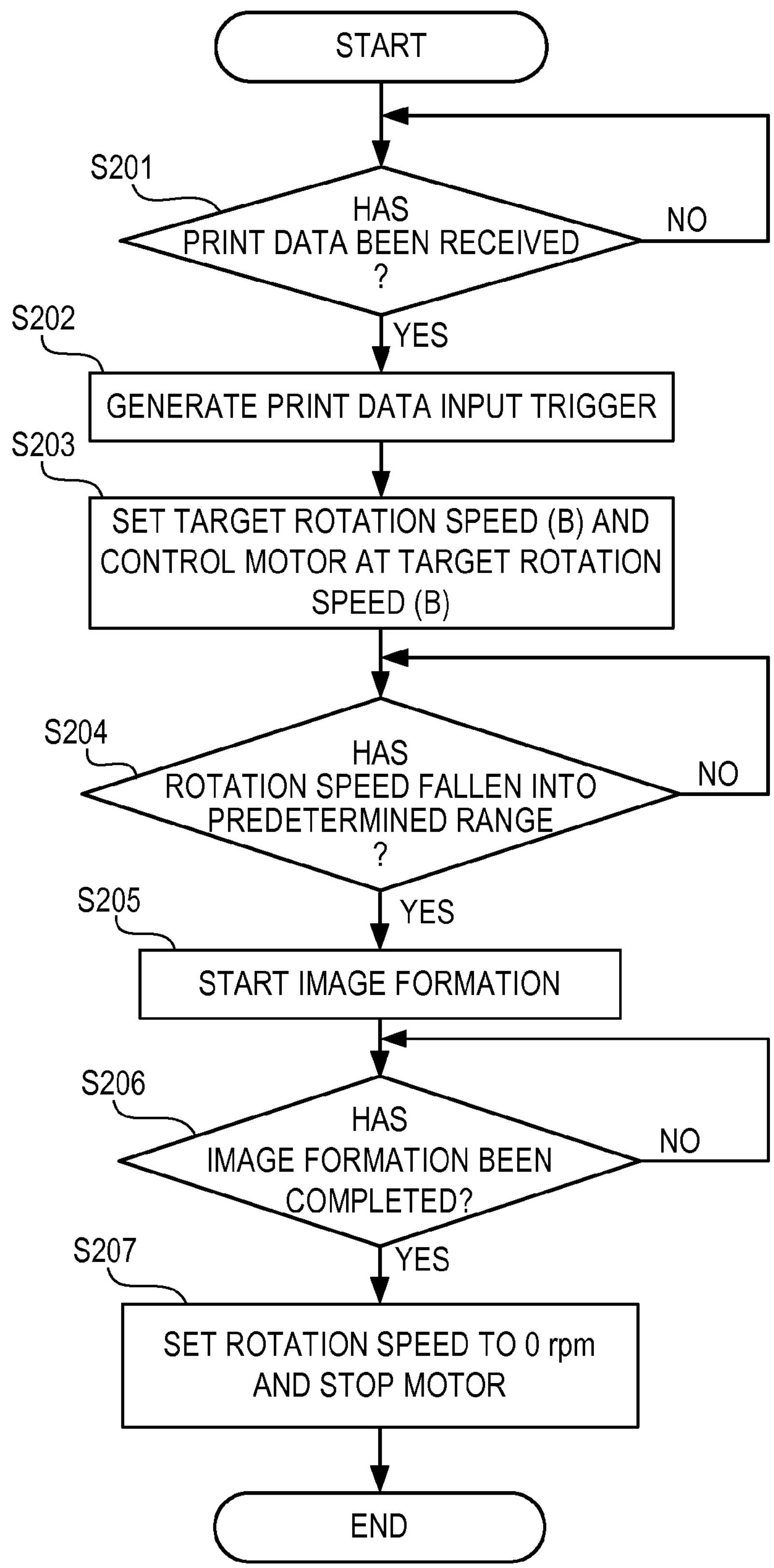
FIG. 7 is a flowchart illustrating a control procedure of the image forming apparatus according to Example 2.

FIG. 7 is a flowchart illustrating a control procedure performed by the CPU 301 when the control of the motor 102, which has been described referring to FIG. 6, is executed. When the print job data receiving portion 501 receives the print data 500 (YES in Step S201), the CPU 301 internally generates a print data input trigger (Step S202). Next, simultaneously with the start of the rotation of the photosensitive drums 107, the CPU 301 sets the target rotation speed (the setting value B: for example, 45,000 rpm) in the ASIC 601 (Step S203). Here, the ASIC 601 instructs the motor control IC 602 to control the motor 102 at a predetermined rotation speed. Specifically, the motor 102 is started to output the FG signal to the ASIC 601. The ASIC 601 outputs the ACC signal or the DEC signal to the motor control IC 602 while detecting the FG signals, thereby controlling the rotation speed of the motor 102.

Thereafter, the CPU 301 controls the motor 102 so that the motor 102 stably rotates at the target rotation speed (the setting value B). Specifically, the motor 102 is accelerated or decelerated until the FG target value obtained by conversion from the target rotation speed falls within the predetermined accuracy range (for example, 45,000 rpm±0.5% in the rotation speed) (YES in Step S204). Thereafter, the light source 101 is controlled to emit light. The rotation speed control is switched to the rotation speed control based on the intervals between the BD signals output from the BD 106 to execute the image formation (Step S205). After the image formation is completed (YES in Step S206), the light emission of the light source 101 is stopped, and the rotation of the motor 102 is stopped (Step S207).

(Second Embodiment)

Next, a second embodiment will be described. In the first embodiment, the copy job and the print job are described separately. On the other hand, in the second embodiment, a case where the print job is detected during the execution of the preaction of the copy job will be described.

A configuration of the image forming apparatus 100 according to the second embodiment is the same as that of the image forming apparatus 100 according to the first embodiment (See FIG. 1 and FIG. 2.). Therefore, in the following description, the members (components) of the image forming apparatus 100 according to the second embodiment are described with the same reference symbols as those used in the first embodiment.

Figure 8:
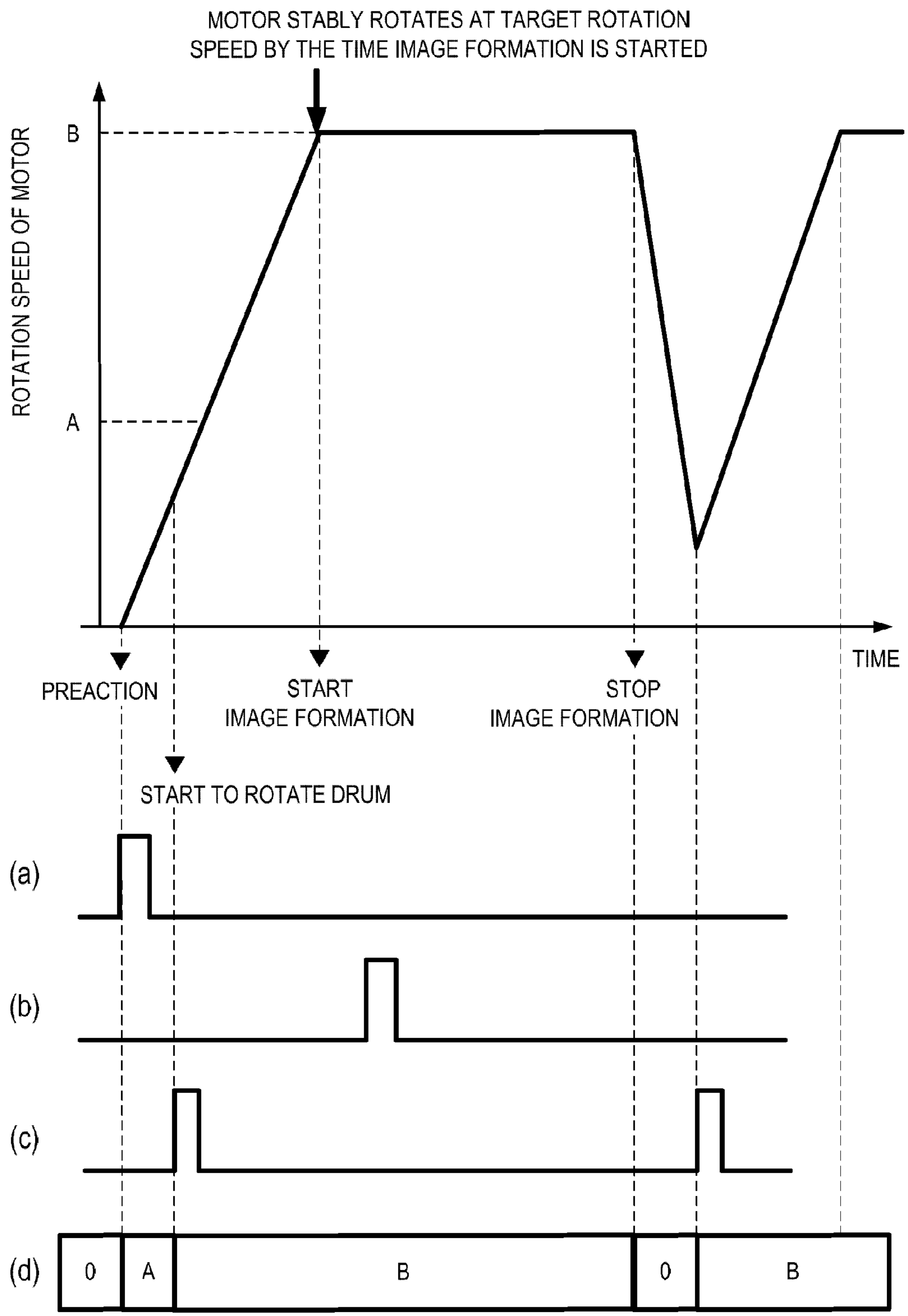
FIG. 8 is a diagram showing a relationship among timing charts and a rotation speed of a motor according to a second embodiment.

FIG. 8 is a diagram showing a relationship among timing charts and a rotation speed of the motor 102 according to the second embodiment. Part (a) of FIG. 8 is a timing chart of an output pulse of a sensor (for example, the pressure plate opening and closing sensor 220) configured to detect a predetermined action performed on the reading device 218 or the operating portion 400. Part (b) of FIG. 8 is a timing chart of an output pulse of a sensor configured to detect the press of the start button 402 of the operating portion 400. Part (c) of FIG. 8 is a timing chart of a trigger pulse generated when the print data 500 is input to the print job data receiving portion 501. Part (d) of FIG. 8 is a graph showing a target rotation speed setting value of the motor 102 on a time axis. While the rotary polygon mirror 103 is in the stopped state, the predetermined action for the image formation (the preaction for the image forming operation) is performed on the reading device 218 or the operating portion 400 (See part (a) of FIG. 8.). Then, the CPU 301 sets the first rotation speed (the setting value A: for example, 30,000 rpm) in the ASIC 601, and starts driving the motor 102 (See part (d) of FIG. 8.).

In this case, the FG signals are detected to control the rotation speed of the motor 102 without lighting the light source 101 so as not to shorten the lifetime of the light source 101. In this step, before the rotation speed of the motor 102 reaches the first rotation speed (the setting value A: 30,000 rpm), the print job data receiving portion 501 receives the print data 500. Then, the CPU 301 internally generates the print data input trigger (See part (c) of FIG. 8.). Simultaneously, the CPU 301 sets the second rotation speed (the setting value B: for example, 45,000 rpm) higher than the first rotation speed in the ASIC 601 so as to execute the image formation (See part (d) of FIG. 8.). In this stage, the start button 402 is not pressed yet. Therefore, whether or not to execute the image formation for the copy job is not determined. Thus, the image formation for the print job is preferentially performed. Thereafter, when the start button 402 is pressed during the execution of the print job (See part (c) of FIG. 8.), the image formation for the copy job is executed subsequent to the image formation for the print job.

Next, when a new print job is detected while the motor 102 is decelerating to stop after the copy job or the print job is completed, the CPU 301 internally generates a new print data input trigger (See part (c) of FIG. 8.). Simultaneously, the CPU 301 sets the rotation speed (the setting value B: for example, 45,000 rpm) for the execution of the image formation in the ASIC 601 (See part (d) of FIG. 8.).

As described above, by controlling the motor 102, even in a case where the print job is detected when the preaction of the copy job is performed, the image formation is enabled without delaying the first print output time while reducing the noise of the motor 102.

Figure 9:
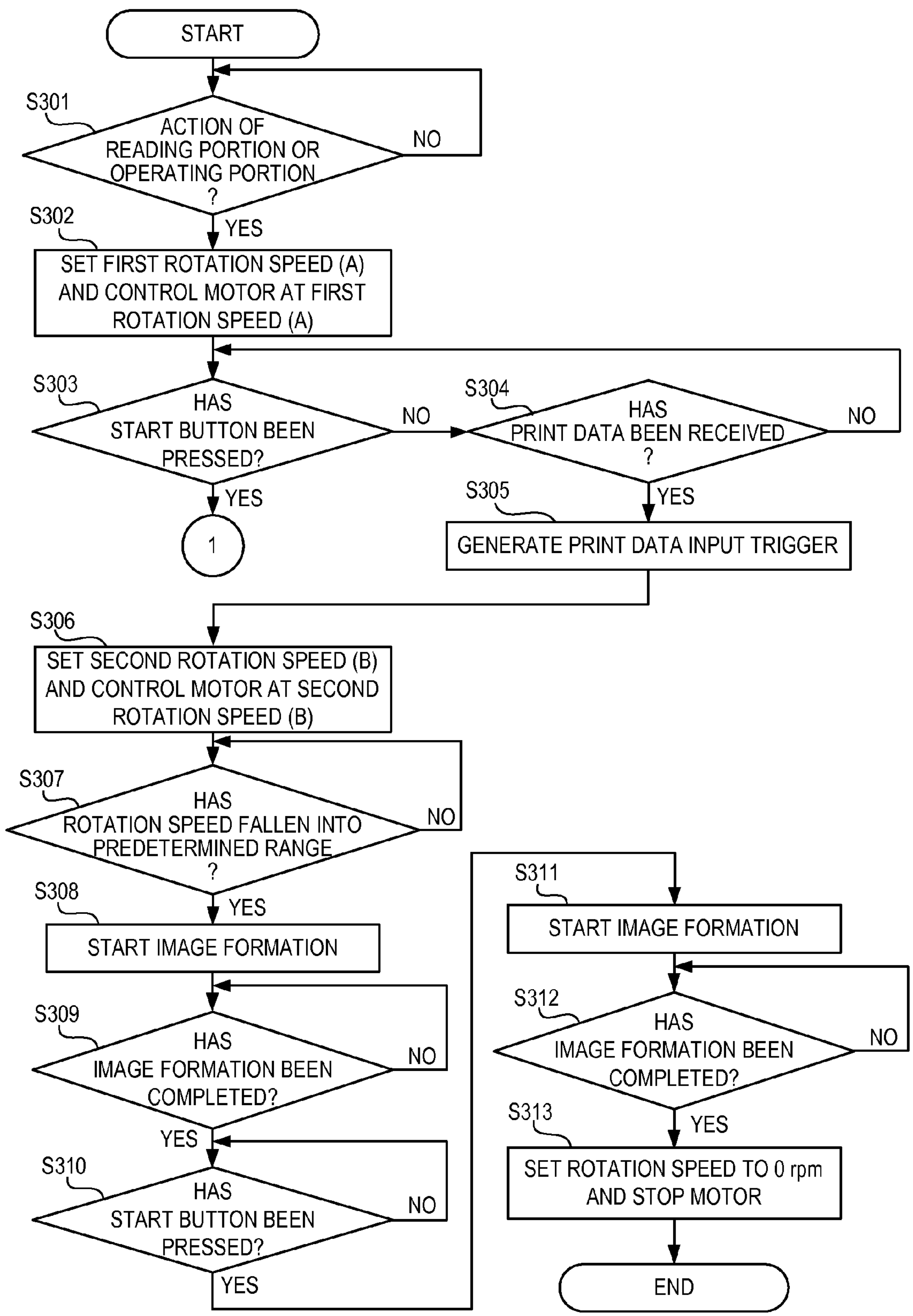
FIG. 9 is a flowchart illustrating a control procedure of an image forming apparatus according to the second embodiment.

FIG. 9 is a flowchart illustrating a control procedure performed by the CPU 301 when the control of the motor 102, which has been described referring to FIG. 8, is executed. When the CPU 301 detects the opening of the original pressure plate 219 by the pressure plate opening and closing sensor 220 of the reading device 218 or the action performed on the operating portion 400 (YES in Step S301), the CPU 301 sets the first rotation speed (the setting value A: 30,000 rpm in this case) in the ASIC 602 (Step S302). The ASIC 601 instructs the motor control IC 602 to control the motor 102 at the predetermined rotation speed. Specifically, the motor 102 is started to output the FG signal to the ASIC 601. The ASIC 601 outputs the ACC signal or the DEC signal to the motor control IC 602 while detecting the FG signals, thereby controlling the rotation speed of the motor 102.

Thereafter, when it is determined as YES in Step S303, the process proceeds to Step S104 of FIG. 5 illustrating the control flow of the copy job, and then the second rotation speed is set. On the other hand, when the user does not press the start button 402 for starting the copy (NO in Step S303), the print data 500 is received by the print job data receiving portion 501 (YES in Step S304). Then, the CPU 301 internally generates the print data input trigger (Step S305). Next, simultaneously with the start of the rotation of the photosensitive drums 107, the CPU 301 sets the second rotation speed (the setting value B: 45,000 rpm in this case) in the ASIC 601 (Step S306).

Next, the ASIC 601 controls the motor 102 so as to accelerate the motor 102 while detecting the FG signals output from the motor 102. Then, the ASIC 601 controls the motor 102 so that the motor 102 stably rotates at the target rotation speed (the second rotation speed: the setting value B). Specifically, the motor 102 is accelerated or decelerated until the FG target value obtained by the conversion from the target rotation speed falls within the predetermined accuracy range (for example, 45,000 rpm±0.5% in the rotation speed) (YES in Step S307). Thereafter, the light source 101 is controlled to emit light. The rotation speed control is switched to the rotation speed control based on the intervals between the BD signals output from the BD 106. Then, the image formation is executed (Step S308).

Next, after the image formation is completed (YES in Step S309), when the start button 402 is pressed between Step S304 and Step S309 (YES in Step S310), the image formation for the copy job is started (Step S311). Thereafter, after the image formation is completed (YES in Step S312), the light emission of the light source 101 is stopped, and the rotation of the motor 102 is stopped (Step S313). When it is determined as NO in Step S310, the CPU 301 waits for the press of the start button 402 for the copy action.

When the print job is detected during the deceleration of the motor 102 after the completion of the work, the image formation is executed in the control procedure described referring to FIG. 6 and FIG. 7.

As described above, the motor 102 is started at the different rotation speeds for the print job and the copy job. In this manner, the noise of the motor 102 can be reduced without delaying the start of the image formation.

According to the embodiments described above, the first print output time due to increase in start time of the motor configured to rotate the rotary polygon mirror, which occurs in the image formation based on the image data output from the external information device, can be prevented from being delayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-238794, filed Nov. 26, 2014, which is hereby incorporated by reference herein in its entirety.

What is claimed is:

1. An image forming apparatus, comprising:

a receiving portion configured to receive image data from an external information device;

a reading device configured to read an original to generate image data;

an operating portion through which an image forming condition and an instruction to start image formation are input;

a light source configured to emit a light beam for forming an electrostatic latent image on a photosensitive member;

a rotary polygon mirror configured to deflect the light beam so that the light beam scans the photosensitive member;

a motor configured to rotate the rotary polygon mirror;

a motor control portion configured to start the motor to control the motor at a first rotation speed in response to a fact that a predetermined action is performed on one of the operating portion and the reading device in a stopped state of the rotary polygon mirror, and then to control the motor at a second rotation speed higher than the first rotation speed in response to the instruction from the operating portion, the motor control portion being configured to control the motor at the second rotation speed, without controlling the motor at the first rotation speed, in response to a fact that the receiving portion receives the image data before a rotation speed of the motor reaches the first rotation speed; and a light source control portion configured to control the light source to emit the light beam based on the image data in a state in which the rotary polygon mirror is rotated by the motor at the second rotation speed.

2. An image forming apparatus according to claim 1, wherein the motor control portion is configured to start the motor in response to the fact that the receiving portion receives the image data from the external information device in the stopped state of the rotary polygon mirror, and to control the motor at the second rotation speed without controlling the motor at the first rotation speed.

3. An image forming apparatus according to claim 1, wherein the motor control portion is configured to start the motor toward the first rotation speed in response to a fact that an input action of the image forming condition is performed on the operating portion as the predetermined action in the stopped state of the rotary polygon mirror.

4. An image forming apparatus according to claim 1, wherein the reading device comprises:

an original platen on which an original is placed; and an original pressure plate which is openable and closable with respect to the original platen, and wherein the motor control portion is configured to start the motor toward the first rotation speed in response to a fact that an opening and closing action is performed on the original pressure plate in the stopped state of the rotary polygon mirror.

5. An image forming apparatus according to claim 4, wherein the reading device further comprises:

an original stacking portion on which originals are stacked;

a conveyance portion configured to convey the originals stacked on the original stacking portion to a reading position in which the originals are read one by one; and a detection portion configured to detect that the originals are stacked on the original stacking portion, and wherein the motor control portion is configured to start the motor toward the first rotation speed in response to a fact that the detection portion detects that the originals are stacked on the original stacking portion in the stopped state of the rotary polygon mirror.

6. An image forming apparatus according to claim 1, further comprising a motion sensor configured to detect that a person approaches the image forming apparatus within a predetermined distance from the image forming apparatus, wherein the motor control portion is configured to start the motor toward the first rotation speed in response to a fact that the motion sensor detects that the person approaches the image forming apparatus within the predetermined distance.

7. An image forming apparatus, comprising:

a receiving portion configured to receive image data from an external information device;

a reading device configured to read an original to generate image data;

an operating portion through which an image forming condition and an instruction to start image formation are input;

a light source configured to emit a light beam for forming an electrostatic latent image on a photosensitive member;

a rotary polygon mirror configured to deflect the light beam so that the light beam scans a surface of the photosensitive member;

a motor configured to rotate the rotary polygon mirror;

a setting portion configured to set a target value of a rotation speed of the rotary polygon mirror to a first rotation speed in response to a fact that a predetermined action is performed on one of the operating portion and the reading device in a stopped state of the rotary polygon mirror, and then change the target value to a second rotation speed higher than the first rotation speed in response to the instruction from the operating portion, the setting portion being configured to set the target value of the rotation speed of the rotary polygon mirror to the second rotation speed, without setting the target value to the first rotation speed, in response to a fact that the receiving portion receives the image data from the external information device in the stopped state of the rotary polygon mirror;

a motor control portion configured to control the motor so that the rotary polygon mirror rotates at the target value set by the setting portion; and a light source control portion configured to control the light source to emit the light beam based on the image data in a state in which the rotary polygon mirror is rotated at the second rotation speed by the motor.

8. An image forming apparatus according to claim 7, wherein the motor control portion is configured to start the motor in response to the fact that the receiving portion receives the image data from the external information device in the stopped state of the rotary polygon mirror, and to control the motor at the second rotation speed without controlling the motor at the first rotation speed.

9. An image forming apparatus according to claim 7, wherein the motor control portion is configured to start the motor toward the first rotation speed in response to a fact that an input action of the image forming condition is performed on the operating portion as the predetermined action in the stopped state of the rotary polygon mirror.

10. An image forming apparatus according to claim 7, wherein the reading device comprises:

an original platen on which an original is placed; and an original pressure plate which is openable and closable with respect to the original platen, and wherein the motor control portion is configured to start the motor toward the first rotation speed in response to a fact that an opening and closing action is performed on the original pressure plate in the stopped state of the rotary polygon mirror.

11. An image forming apparatus according to claim 10, wherein the reading device further comprises:

an original stacking portion on which originals are stacked;

a conveyance portion configured to convey the originals stacked on the original stacking portion to a reading position in which the originals are read one by one; and a detection portion configured to detect that the originals are stacked on the original stacking portion, and wherein the motor control portion is configured to start the motor toward the first rotation speed in response to a fact that the detection portion detects that the originals are stacked on the original stacking portion in the stopped state of the rotary polygon mirror.

12. An image forming apparatus according to claim 7, further comprising a motion sensor configured to detect a person approaches the image forming apparatus within a predetermined distance from the image forming apparatus, wherein the motor control portion is configured to start the motor toward the first rotation speed in response to a fact that the motion sensor detects that the person approaches the image forming apparatus within the predetermined distance.

13. An image forming apparatus, comprising:

a receiving portion configured to receive image data from an external information device;

a reading device configured to read an original to generate image data;

an operating portion through which an image forming condition and an instruction to start image formation are input;

a light source configured to emit a light beam for forming an electrostatic latent image on a photosensitive member;

a rotary polygon mirror configured to deflect the light beam so that the light beam scans a surface of the photosensitive member;

a motor configured to rotate the rotary polygon mirror;

a motor control portion configured to control the motor by setting a target value of a rotation speed of the rotary polygon mirror to a first rotation speed in response to a fact that a predetermined action is performed on one of the operating portion and the reading device in a stopped state of the rotary polygon mirror, and then changing the target value to a second rotation speed higher than the first rotation speed in response to the instruction from the operating portion, the motor control portion being configured to control the motor by setting the target value of the rotation speed of the rotary polygon mirror to the second rotation speed, without setting the target value to the first rotation speed, in response to a fact that the receiving portion receives the image data from the external information device in the stopped state of the rotary polygon mirror; and a light source control portion configured to control the light source to emit the light beam based on the image data in a state in which the rotary polygon mirror is rotated at the second rotation speed by the motor.

14. An image forming apparatus according to claim 13, wherein the motor control portion is configured to start the motor in response to the fact that the receiving portion receives the image data from the external information device in the stopped state of the rotary polygon mirror, and to control the motor at the second rotation speed without controlling the motor at the first rotation speed.

15. An image forming apparatus according to claim 13, wherein the motor control portion is configured to start the motor toward the first rotation speed in response to a fact that an input action of the image forming condition is performed on the operating portion as the predetermined action in the stopped state of the rotary polygon mirror.

16. An image forming apparatus according to claim 13, wherein the reading device comprises:

an original platen on which an original is placed; and an original pressure plate which is openable and closable with respect to the original platen, and wherein the motor control portion is configured to start the motor toward the first rotation speed in response to a fact that an opening and closing action is performed on the original pressure plate in the stopped state of the rotary polygon mirror.

17. An image forming apparatus according to claim 16, wherein the reading device further comprises:

an original stacking portion on which originals are stacked;

a conveyance portion configured to convey the originals stacked on the original stacking portion to a reading position in which the originals are read one by one; and a detection portion configured to detect that the originals are stacked on the original stacking portion, and wherein the motor control portion is configured to start the motor toward the first rotation speed in response to a fact that the detection portion detects that the originals are stacked on the original stacking portion in the stopped state of the rotary polygon mirror.

18. An image forming apparatus according to claim 13, further comprising a motion sensor configured to detect that a person approaches the image forming apparatus within a predetermined distance from the image forming apparatus, wherein the motor control portion is configured to start the motor toward the first rotation speed in response to a fact that the motion sensor detects that the person approaches the image forming apparatus within the predetermined distance.

* * * * *